United States Patent
Katterhenry et al.

(10) Patent No.: US 9,283,718 B2
(45) Date of Patent: Mar. 15, 2016

(54) REDUCED-TILT BACK PLASTIC FEATURE FOR A CONTACT LENS MOLD

(75) Inventors: David A. Katterhenry, Jacksonville, FL (US); Cory R. Katterhenry, legal representative, Jacksonville, FL (US); Radhakrishnan Damodharan, Jacksonville, FL (US); Jose L. Perez, Jacksonville, FL (US); Philippe F. Jubin, Fernandina Beach, FL (US); Timothy A. Clutterbuck, Jacksonville, FL (US); Pierre-Yves Gerligand, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 202 days.

(21) Appl. No.: 13/480,780

(22) Filed: May 25, 2012
(Under 37 CFR 1.47)

(65) Prior Publication Data

US 2013/0313404 A1 Nov. 28, 2013

(51) Int. Cl.
*B29C 39/44* (2006.01)
*B29D 11/00* (2006.01)
*B29C 39/02* (2006.01)

(52) U.S. Cl.
CPC .............. *B29D 11/005* (2013.01); *B29C 39/028* (2013.01); *B29D 11/00038* (2013.01)

(58) Field of Classification Search
CPC ........... B29D 11/00038; B29D 11/005; B29C 39/026; B29C 39/028
USPC ......... 425/406, 408, 412, 415, 808; 264/1.32, 264/2.2, 2.5
See application file for complete search history.

(56) References Cited

U.S. PATENT DOCUMENTS

| | | | |
|---|---|---|---|
| 4,407,766 A | 10/1983 | Haardt et al. | |
| 4,955,580 A | 9/1990 | Seden et al. | |
| 5,036,971 A * | 8/1991 | Seden et al. | 206/5.1 |
| 5,252,056 A | 10/1993 | Horner et al. | |
| 5,466,147 A | 11/1995 | Appleton et al. | |
| 5,508,317 A | 4/1996 | Muller | |
| 5,540,410 A | 7/1996 | Lust et al. | |
| 5,583,163 A | 12/1996 | Muller | |
| 5,716,540 A | 2/1998 | Matiacio et al. | |
| 5,789,464 A | 8/1998 | Muller | |
| 5,849,810 A | 12/1998 | Muller | |

(Continued)

FOREIGN PATENT DOCUMENTS

| | | | |
|---|---|---|---|
| DE | 19727671 A1 * | 1/1999 | ........... B29C 33/00 |
| EP | 051027 B1 | 4/1985 | |

(Continued)

OTHER PUBLICATIONS

Written Opinion dated Mar. 11, 2014 for Application No. 201303915-1.

(Continued)

*Primary Examiner* — Yogendra Gupta
*Assistant Examiner* — Emmanuel S Luk
(74) *Attorney, Agent, or Firm* — Carl J. Evens (57) ABSTRACT

A mold assembly for manufacturing ophthalmic lenses which comprises an anti-tilt feature that prevent relative movement of one half of the mold assembly relative to the other half of the mold assembly. The anti-tilt feature ensures that the edges of the ophthalmic lenses are symmetric around their periphery.

4 Claims, 7 Drawing Sheets

(56) References Cited

U.S. PATENT DOCUMENTS

| | | | |
|---|---|---|---|
| 5,975,875 A * | 11/1999 | Crowe et al. | 425/215 |
| 6,158,861 A * | 12/2000 | Oyama et al. | 351/159.58 |
| 6,405,993 B1 * | 6/2002 | Morris | 249/141 |
| 6,444,145 B1 | 9/2002 | Clutterbuck | |
| 6,923,538 B2 | 8/2005 | Dean | |
| 8,092,724 B2 | 1/2012 | Pruitt et al. | |
| 2002/0093113 A1 * | 7/2002 | Ansell et al. | 264/2.5 |
| 2004/0108607 A1 * | 6/2004 | Winterton et al. | 264/1.32 |
| 2005/0100631 A1 * | 5/2005 | Baba et al. | 425/808 |
| 2006/0006558 A1 * | 1/2006 | Yamada | 264/2.2 |
| 2007/0035051 A1 * | 2/2007 | Darnton et al. | 264/1.32 |
| 2007/0132124 A1 | 6/2007 | Dubey et al. | |
| 2008/0054505 A1 * | 3/2008 | Yao et al. | 264/2.6 |
| 2009/0102078 A1 * | 4/2009 | Goodenough et al. | 264/1.32 |
| 2009/0166904 A1 * | 7/2009 | Lawton et al. | 264/1.32 |
| 2009/0224417 A1 * | 9/2009 | Lawton et al. | 264/2.5 |
| 2011/0089584 A1 * | 4/2011 | Plaza et al. | 264/1.1 |

FOREIGN PATENT DOCUMENTS

| | | | | |
|---|---|---|---|---|
| EP | 484089 A1 | * | 5/1992 | B29C 33/30 |
| EP | 1561560 A1 | * | 8/2005 | B29C 39/26 |
| GB | 2230730 A | | 4/1989 | |
| GB | 2230730 A | * | 10/1990 | B29D 11/00 |
| GB | 2235407 B | * | 1/1993 | B29D 11/00 |
| JP | 05337957 A | * | 12/1993 | B29C 39/02 |
| WO | WO 0053401 A1 | * | 9/2000 | B29D 11/00 |
| WO | WO 2008149404 A1 | * | 12/2008 | B29C 43/02 |

OTHER PUBLICATIONS

Singapore Search Report dated Feb. 25, 2014 for corresponding Patent Application No. 201303915-1.

* cited by examiner

FIG. 5

REDUCED-TILT BACK PLASTIC FEATURE FOR A CONTACT LENS MOLD

BACKGROUND OF THE INVENTION

1. Field of the Invention

The present invention relates to the manufacture of contact lenses via cast molding, and more particularly to the cast molding of contact lenses having contoured edges utilizing an improved mold with anti-tilt features to improve the lens edge around the full circumference of the lens.

2. Discussion of the Related Art

Historically, contact lenses were manufactured by machining a lens material, in button or block form, to produce an unfinished lens product having the required fit or base curve and visual correction to compensate for one or more refractive abnormalities or errors of the eye. Such refractive abnormalities or errors include myopia, hyperopia, astigmatism and presbyopia. Utilizing conventional machining technology, for example, a lathe, the optic faces of the unfinished lenses required polishing in order to remove turning rings produced in the machining process. Typically, the edge of the machined lenses was also polished to produce a smooth edge geometry and/or profile in order to maximize wearer comfort and prevent injury to the eye.

The machining and polishing process described above is labor intensive and has been widely replaced by cast molding. Cast molding of contact lenses offers a number of advantages over machined lenses. For example, with a cast molding process it is possible to produce contact lenses with a high level or degree of repeatability. In other words, with a cast molding process it is possible to produce many lenses which have the same shape and optical characteristics. In addition, a molded contact lens may be formed to any desired shape, subject only to the producibility constraints of the mold.

In general, molded lenses are formed by depositing a curable liquid such as a polymerizable monomer into a mold cavity, curing the liquid into a solid state, opening the mold cavity and removing the lens. Other processing steps, including hydration, may also be performed. In conventional cast molding techniques, front and back surface mold halves are made for the required lens prescription. Each mold section includes a negative impression of or a contour which corresponds to the desired lens front or back surface. The two mold halves are then assembled and lens material, for example a curable liquid polymerizable monomer, is introduced into the cast mold. After the cast molding steps, subsequent processing steps are employed which may include curing, demolding, hydration in the case of hydrogel lenses, and edge polishing if needed. Fully cast molded lenses are lenses in which all surfaces, front, back and the edge of the lens are molded as part of a mold pair and no post processing polishing or machining operations are performed to yield the final lens product.

Although fully molded lenses provide an inexpensive and flexible alternative to machined and polished cast molded lenses, fully molded lenses are sometimes uncomfortable for the wearer, particularly after long term use. Therefore, it would be advantageous to have a fully cast molded contact lens comprising a desired edge geometry without the need for post processing polishing steps. Currently utilized contact lens molds do not permit production of lens edges that are contoured and which would provide comfort as well as increased tear movement between the lens back or concave surface and the lens wearer's cornea. Accordingly, it would be advantageous to have a lens mold for production of a lens having an edge contoured so as to avoid impingement on the lens' wearer's conjunctional membrane. Additionally, known contact lens molds may be problematic in that they permit movement of one mold half of a mold assembly in relation to the other molds half. This movement results in the lens edge shape varying from one side of the contact lens to the other. Accordingly, it would also be desirable to have a mold design which provides for this consistent edge around the entire circumference of the lens while offering a high degree of repeatability in the manufacturing process.

SUMMARY OF THE INVENTION

The reduced tilt back plastic feature for a contact lens mold of the present invention overcomes the difficulties associated in currently utilized molds as briefly set forth above.

In accordance with one aspect, the present invention is directed to a mold assembly for ophthalmic lenses. The mold assembly for ophthalmic lenses comprises a front mold half defining a central concave curved section and a peripheral flat section, a black mold half defining a central convex curved section and a peripheral flat section, and an anti-tilt feature cooperatively associated with at least one of the front mold half and the back mold half, the anti-tilt feature being configured to prevent tilting of the back mold half relative to the front mold half.

The present invention is directed to an improved mold for fabricating lenses, for example, contact lenses. The mold of the present invention utilizes an anti-tilt feature to ensure that the back mold half does not tilt relative to the front mold half during the manufacturing process. A symmetrically positioned anti-tilt feature on the back mold half makes contact with the front mold half in a manner that prevents the back mold half from tilting, thereby ensuring a symmetric and properly shaped contact lens edge around the entire circumference thereof. In addition, the anti-tilt feature introduces an increased repeatability factor. Given that the anti-tilt feature prevents tilting of the back mold half relative to the front mold half, each contact lens made with the same mold assembly will have substantially the same edge configuration. In addition, the anti-tilt feature may be modified to introduce a certain amount of tilt to create specific contact lens edge designs. The anti-tilt feature of the present invention works with mold assemblies requiring a specific repeatable edge design.

The mold assembly with an anti-tilt feature in accordance with the present invention provides an inexpensive, effective and reliable means for manufacturing contact lenses. Once the mold assemblies are modified to include the anti-tilt features, the manufacturing process is simplified in that placement of the back mold half on the front mold half containing the lens material is significantly less prone to positioning error.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

The present invention is directed to an improved mold assembly for manufacturing contact lenses with improved and consistent edges. The lens mold assembly preferably comprises a feature that prevents the movement of the back curve half of the mold relative to the front curve half of the mold.

Figures 1, 1A:
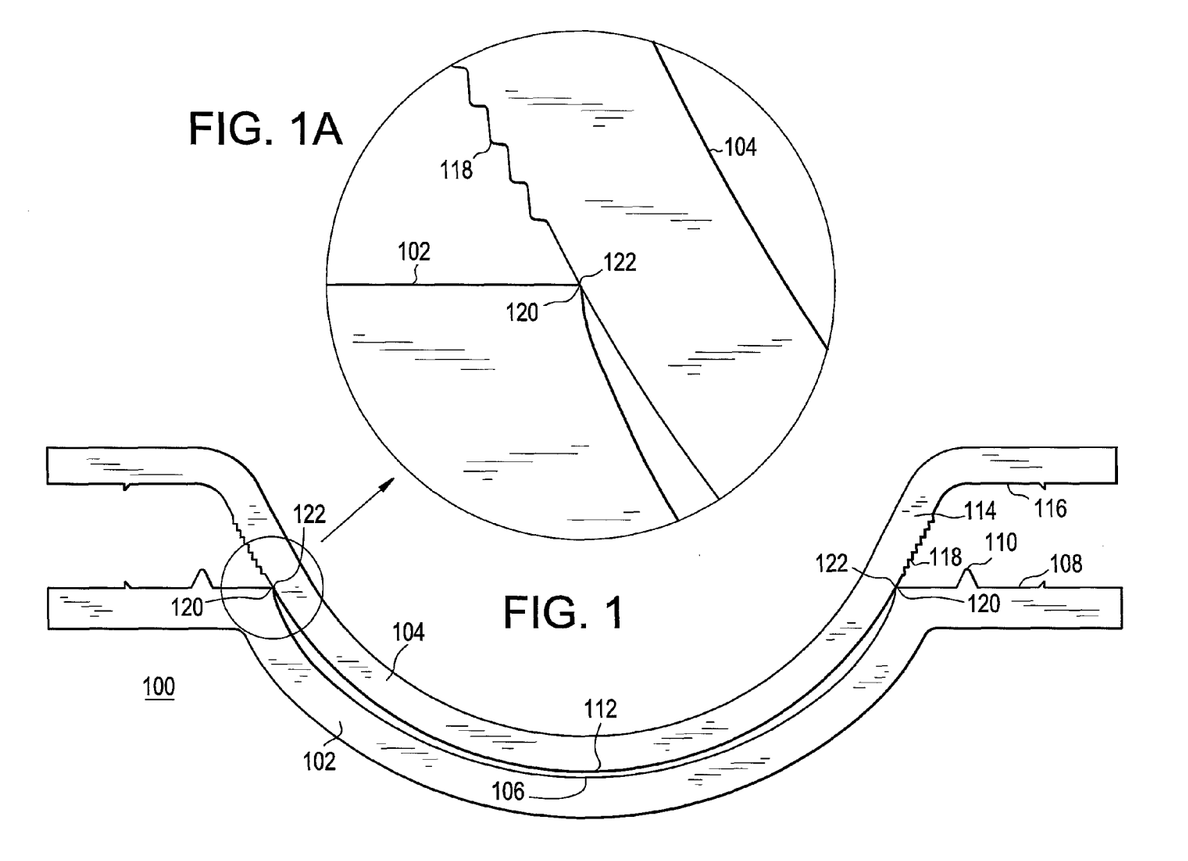
FIG. 1 is a cross-sectional view of a contact lens mold assembly.
FIG. 1A is an exploded or expanded view of a section of the contact lens mold assembly illustrated in FIG. 1.

FIGS. 1 and 1A illustrate, in cross-sectional view and exploded or expanded view respectively, a currently utilized mold assembly 100. The mold assembly 100 comprises complementary mold halves; namely, a front mold half 102 and a back mold half 104. The mold assembly 100 is useful in manufacturing contact lenses by the polymerization of a polymerizable composition. The contact lenses manufactured utilizing the mold assembly 100 are unhydrated or partially hydrated lenses that may be made ready to wear by hydrating or swelling the lenses by any suitable method known in the art.

Front mold half 102 and back mold half 104 may be formed of any suitable material, including any suitable thermoplastic polymer. The thermoplastic polymer is preferably sufficiently transparent to ultra-violet light to allow irradiation therethrough to promote polymerization of the material forming the contact lens. Additionally, it is preferable that the material utilized to form the mold halves 102 and 104 is moldable to surfaces of optical quality at relatively low temperatures, exhibits excellent flow characteristics, and remains amorphous during molding. Preferred materials for forming the mold halves 102 and 104 include polystyrene and polypropylene. Each mold half 102 and 104 may be formed from the same or a different material than the other mold half 102 and 104. Production of the mold halves 102 and 104 may be accomplished utilizing any suitable method, including the method set forth in U.S. Pat. No. 5,540,410.

The front mold half 102 defines a central curved section with an optical quality concave surface 106 and a peripheral flat section 108. The peripheral flat section 108 comprises a protrusion 110 which serves as a stop to prevent excess monomer from covering any remaining portion of the mold assembly 100 and potentially hindering downstream processing, for example, hydration of the contact lens, as is explained in more detail subsequently. The protrusion 110 may comprise any suitable configuration. In the illustrated embodiment, the protrusion 110 comprises a substantially triangular cross-sectional shape. The back mold half 104 defines a central curved section with an optical quality convex surface 112, a flash gathering section 114 and a peripheral flat section 116. The flash gathering section 114 comprises a number of protrusions 118. The protrusions 118 may comprise any suitable configuration, for example, a saw-tooth configuration, and are intended to increase the surface area of the flash gathering section 114 so that the excess monomer or flash that accumulates in the region of the mold assembly 100 adheres to the back mold half 104 and may be removed when the back mold half 104 is removed from the mold assembly 100.

In order to manufacture a contact lens, a liquid polymerizable material is added to the front mold half 102 of the mold assembly 100 and the back mold half 104 is positioned on the liquid polymerizable material such that the front mold half 102 and the back mold half 104 make contact at contact lens edge points 120 and 122. FIG. 1A illustrates an exploded or expanded view of the contact lens edge points 120 and 122. When the front mold half 102 and the back mold half 104 are properly aligned, i.e. no tilt of the back mold half 104 relative to the front mold half 102, the resultant contact lens will have a well contoured and high quality symmetric edge around its entire circumference. If tilt of greater than 0.3 degrees is introduced, the quality and shape of the lens edge may be reduced. Accordingly, the contact lens edge points 120 and 122 are preferably symmetric relative to the front and back mold halves 102 and 104.

Once the back mold half 104 is properly positioned and secured, the polymerizable material in the mold assembly 100 is cured, for example, utilizing ultra-violet light to form a lens. Any excess material or flash is preferably captured in the flash gathering section 114 and may be removed all at once as the back mold half 104 is removed from the front mold half 102. With the contact lens edge points 120 and 122 properly aligned, the removal of the back mold half 104 should leave the contact lens in the front mold half 102 with the desired edge. The front mold half 102 and the contact lens may then be positioned for further processing, for example, lens hydration, prior to removal of the lens and packaging.

Figures 2, 2A:
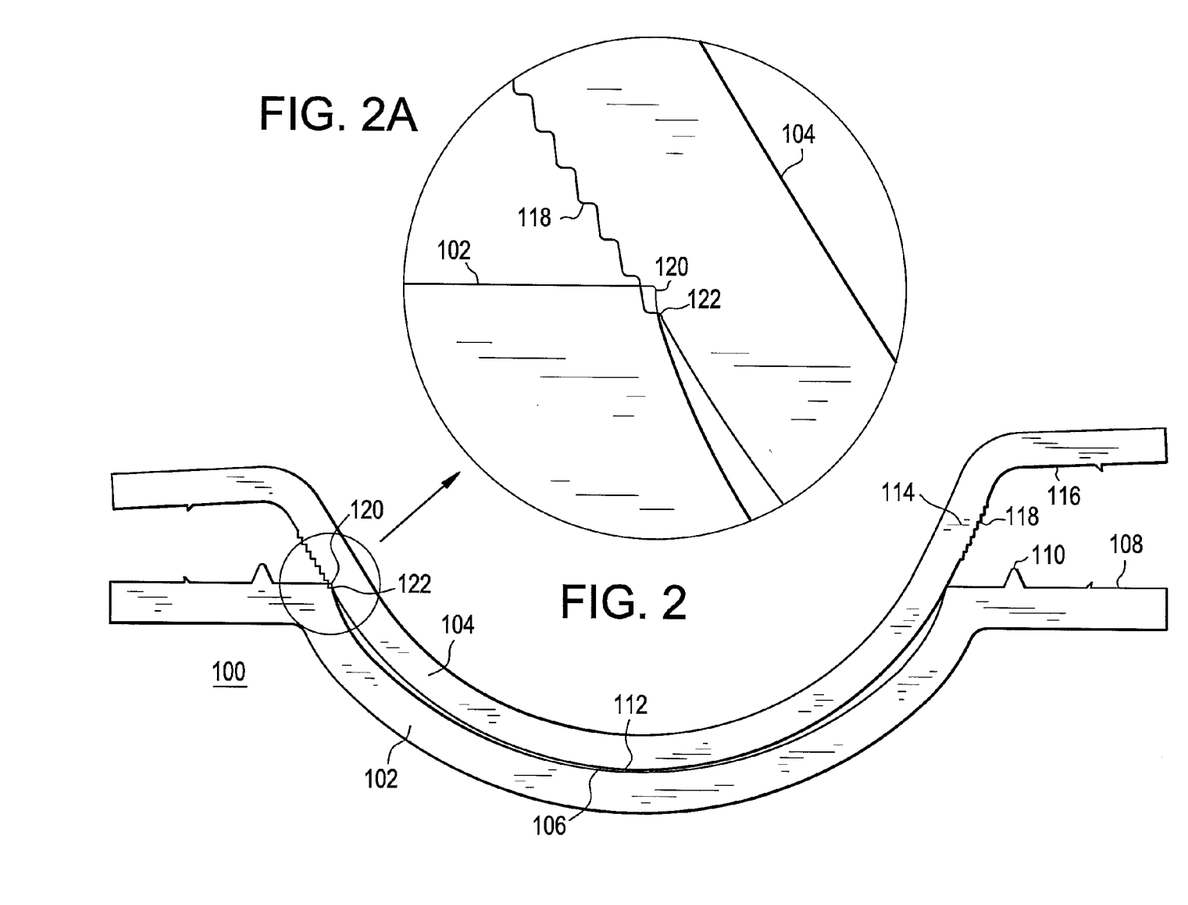
FIG. 2 is a cross-sectional view of the contact lens mold assembly of FIG. 1 with the back mold half tilted relative to the front mold half.
FIG. 2A is an exploded or expanded view of a section of the contact lens mold assembly illustrated in FIG. 2.

FIGS. 2 and 2A illustrate, in cross-section view and exploded or expanded view respectively, the lens mold assembly 100 of FIGS. 1 and 1A with the back mold half 104 tilted approximately three (3) degrees off center relative to the front mold half 102. As may be seen from a comparison of FIGS. 2A and 1A, the edge of the contact lens would comprise a different configuration as well as being non-symmetric around the circumference. In other words, if the back mold half 104 is off center from the front mold half 102 more than a predetermined amount, then it is likely that the resulting contact lens will not have a repeatable and reproducible edge as designed, for example, a contoured knife edge.

Figure 3:
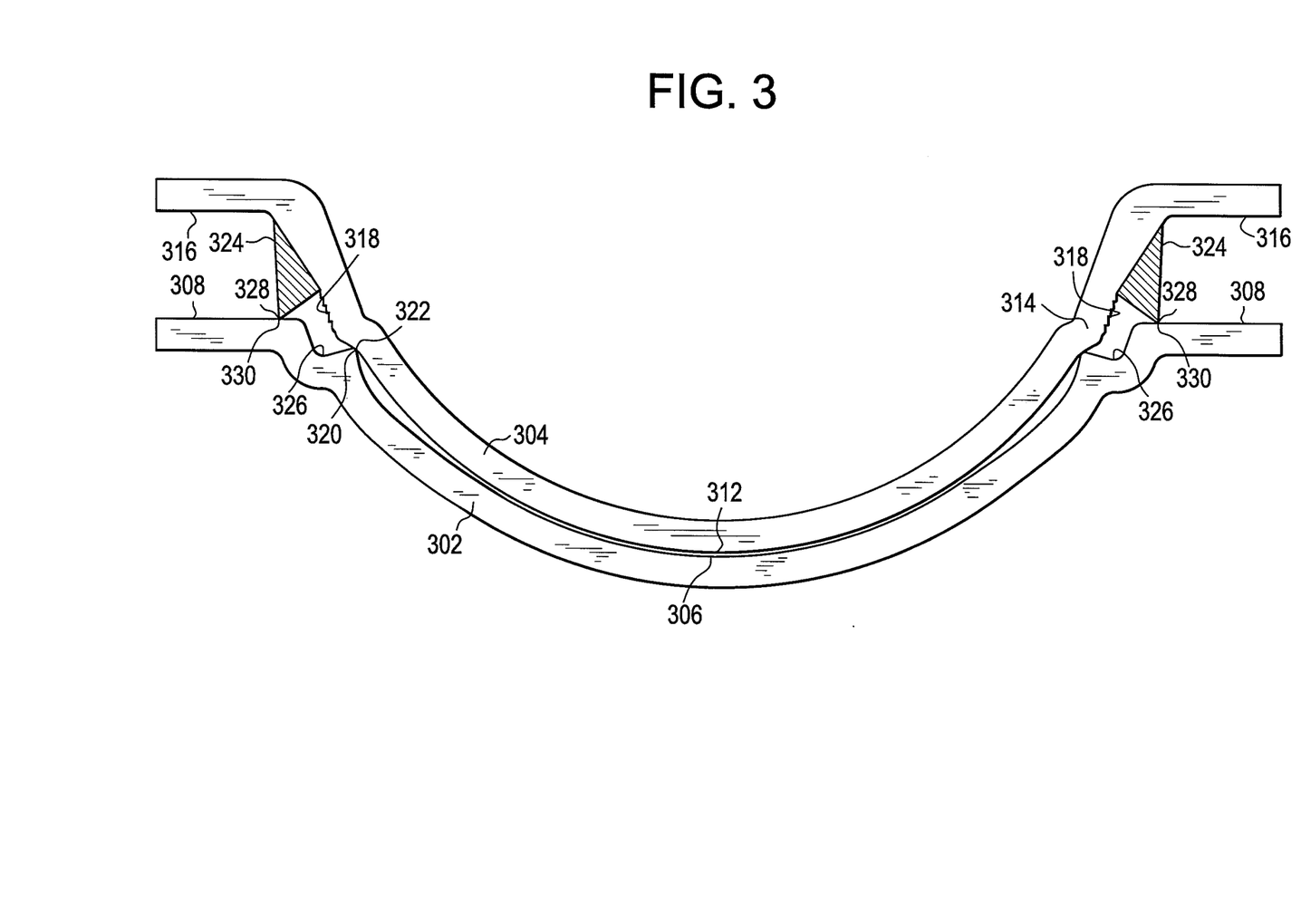
FIG. 3 is a cross-sectional view of a first exemplary contact lens mold assembly with an anti-tilt feature in accordance with the present invention.

Referring now to FIG. 3, there is illustrated an exemplary lens mold assembly 300 comprising an anti-tilt feature 324 in accordance with the present invention. The front mold half 302 defines a central curved section with an optical quality concave surface 306 and a peripheral flat section 308. The front mold half 302 also comprises a recess 326 positioned between the concave surface 306 and the peripheral flat section 308. The recess 326 provides a space for the excess material or flash to gather as is explained in greater detail subsequently. The recess 326 may comprise any suitable configuration for holding the flash material. In the illustrated exemplary embodiment, the recess 326 comprises a notch in the front mold half 302 with one end being the contact lens edge point 320. The peripheral flat section 308 does not comprise a protrusion (element 110 in FIG. 1) as the anti-tilt feature 324 performs this function as well. The back mold half 304 defines a central curved section with an optical quality convex surface 312, a flash gathering section 314 and a peripheral flat section 316. The flash gathering section 314 comprises a number of protrusions 318. The protrusions 318 may comprise any suitable configuration, for example, a sawtooth configuration, and are intended to increase the surface area of the flash gathering section 314 so that the excess monomer or flash that accumulates in this region of the mold assembly 300 adheres to the back mold half 304 and may be removed when the back mold half 304 is removed from the mold assembly 300. The back mold half 304 also comprises an anti-tilt feature 324 positioned between the flash gathering section 314 and the peripheral flat section 316. The anti-tilt feature 324 comprises any suitable configuration for preventing the back mold half 304 from tilting relative to the front mold half 302. In the illustrated exemplary embodiment, the anti-tilt feature 324 comprises a substantially triangular cross-sectional shape such that is apex 328 contacts point 330 on the peripheral flat section 308 of the front mold half 302. The anti-tilt feature 324 is positioned on the back mold half 304 so that when it makes contact with the peripheral flat section 308 of the front mold half 302 there is no tilt. The anti-tilt feature 324 may comprise a separate structure that is affixed to the back mold half 304 or it may be an integral/unitary part of the back mold half 304. In the mold assembly 100 of FIG. 1, a protrusion 110 was used as a flash stop; however, the anti-tilt feature 324 also prevents flash from travelling onto the peripheral flat section 308. Accordingly, the front mold half 302 comprises the recess 326 to accommodate the flash material. The manufacturing process is the same as described above. In this exemplary embodiment, the anti-tilt feature 324 ensures that the front mold half 302 and the back mold half 304, come into contact at contact edge points 320 and 322, thereby creating the designed contact lens edge.

Figures 4, 4A:
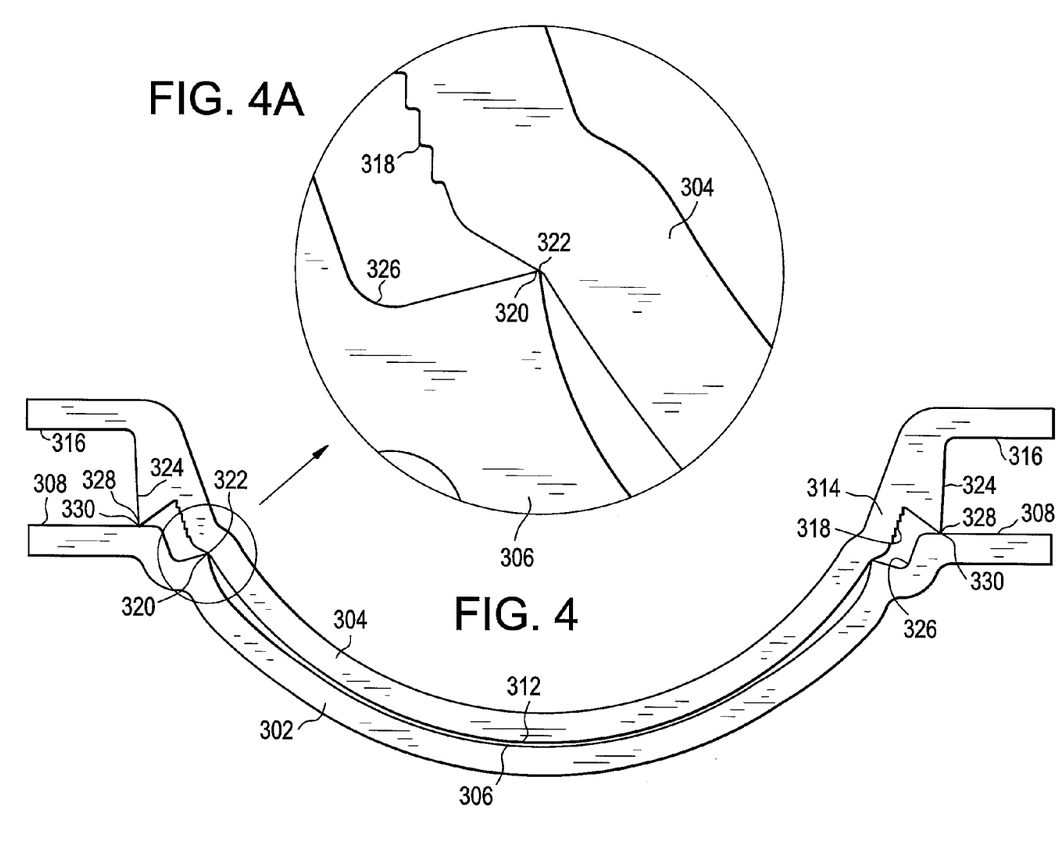
FIGS. 4 and 4A are cross-sectional and exploded or expanded views of the contact lens mold assembly illustrated in FIG. 3.
Figure 5:
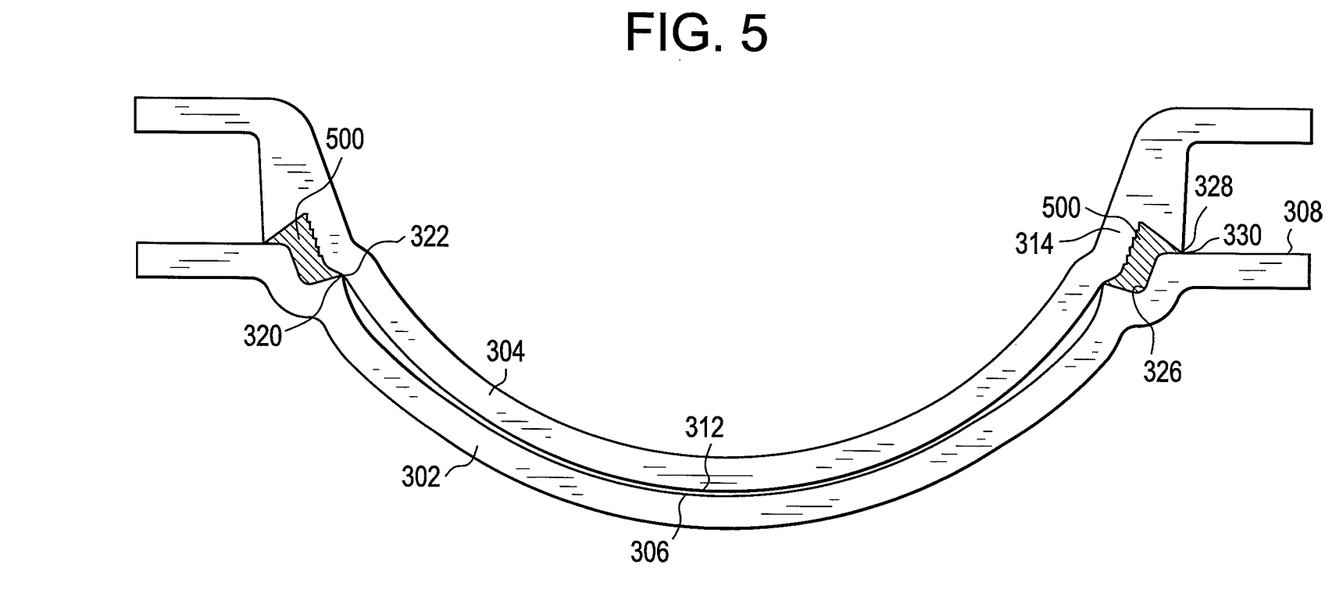
FIG. 5 is a cross-sectional view of a contact lens mold assembly with an anti-tilt feature and flashing in accordance with the present invention.

FIGS. 4 and 4A illustrate, in cross-sectional view and exploded or expanded view respectively, the lens mold assembly 300 of FIG. 3. As illustrated in FIG. 4A, the anti-tilt feature 324 ensures that the contact lens edge points 320 and 322 come together to ensure a properly contoured and symmetric contact lens edge. In addition, good contact between the front and back mold halves 302 and 304 allows for a clean separation of the front and back mold halves 306 and 304 after curing the contact lens. FIG. 5 also illustrates the lens mold assembly 300 comprising an anti-tilt feature 324 in accordance with the present invention. In this drawing; however, flash material 500 is shown in the space between the recess 326 in the front mold half 302 and the flash gathering section 314 of the back mold half 304. The flash material 500 preferably adheres to the protrusions 318 so that all the flashing stays together behind the anti-tilt feature 324 and may be removed all at once with the back mold half 304. Any remaining flashing is not desired as it may contaminate downstream processing.

Figures 6, 6A:
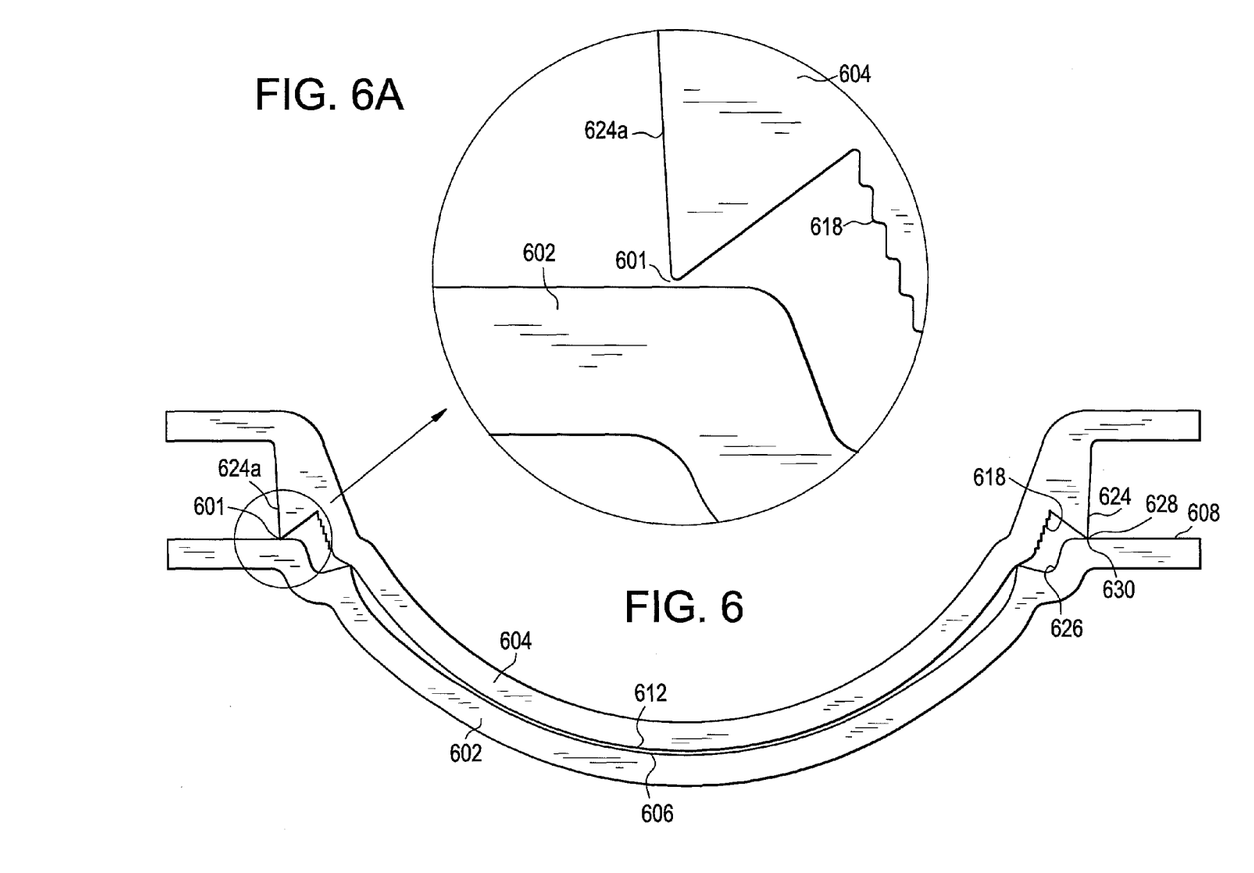
FIGS. 6 and 6A are cross-sectional and exploded or expanded views of an alternate exemplary embodiment of a mold assembly with an anti-tilt feature in accordance with the present invention.
Figures 7, 7A:
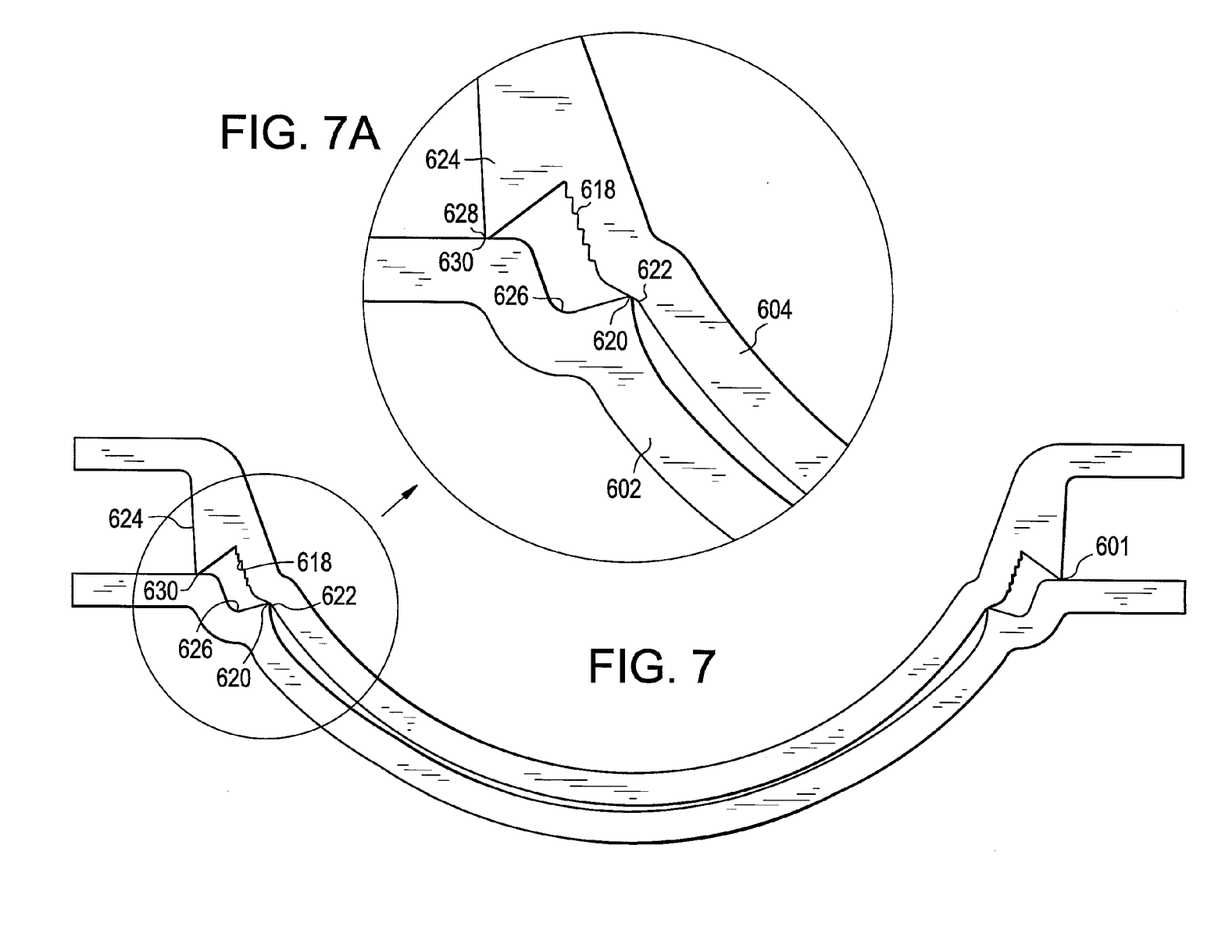
FIGS. 7 and 7A are cross-sectional and exploded or expanded views of the alternate exemplary embodiment of the mold assembly illustrated in FIGS. 6 and 6A with tilt introduced.

In accordance with another exemplary embodiment, it may be desirable to introduce a certain amount of tilt, for example, less than 0.3 degrees. In order to accomplish this, the height of the anti-tilt feature may be shorter and/or longer on one section of the mold half relative to the other. Referring now to FIGS. 6 and 6A, there is illustrated in cross-sectional view an exemplary embodiment wherein the anti-tilt feature 624a is shorter than the tilt feature 624 on the other side of the back mold half 604. FIG. 6A illustrates a gap 601 between the anti-tilt feature 624a and the peripheral flat section 608. This gap 601 allows the back mold half 604 to move or tilt a desired amount relative to the front mold half 602. The size of the gap 601 translates to a degree of tilt and this may be varied depending on the application. For example, it is a simple matter to calculate the size of the gap required once the desired tilt is known. As illustrated in FIGS. 7 and 7A, the gap 601 on one side changes the shape and symmetry of the edge of the contact lens. With the tilt introduced, the contact lens edge points 620 and 622 do not align as is the case with no tilt.

It is important to note that the anti-tilt features set forth above may comprise any suitable shape and/or size and may even vary in height to introduce slight tilt. Although the anti-tilt features are shown as part of the back mold half, they can be part of the front mold half or be part of both halves.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A mold assembly for ophthalmic lenses comprising:
a front mold half defining a central concave curved section and a peripheral flat section, the front mold half comprising a recess positioned between the central concave section and the peripheral flat section;
a back mold half defining a central convex curved section and a peripheral flat section, the back mold half comprising a flash gathering section positioned between the central convex curved section and the peripheral flat section, the flash gathering section comprising protrusions to secure flash; and
an anti-tilt feature attached to the back mold half and extending around the perimeter of the central convex curved section, the anti-tilt feature comprising a protrusion having a substantially triangular cross-sectional shape with a sharp pointed apex that makes contact on the peripheral flat section of the front mold half to prevent unintentional tilting of the back mold half relative to the front mold half, the protrusion extends from the back mold half at an angle wherein only the tip of the sharp pointed apex makes contact with the flat section thereby producing a repeatable and reproducible symmetric and properly shaped contact lens edge, the anti-tilt feature being configured as a stop for the recess and flash gathering section.

2. The mold assembly for ophthalmic lenses according to claim 1, wherein the central concave curved section of the front mold half comprises an optical quality surface.

3. The mold assembly for ophthalmic lenses according to claim 1, wherein the central convex curved section of the back mold half comprises an optical quality surface.

4. The mold assembly for ophthalmic lenses according to claim 1, wherein the back mold half is configured to mate with the front mold half.

* * * * *